Patented Oct. 26, 1954

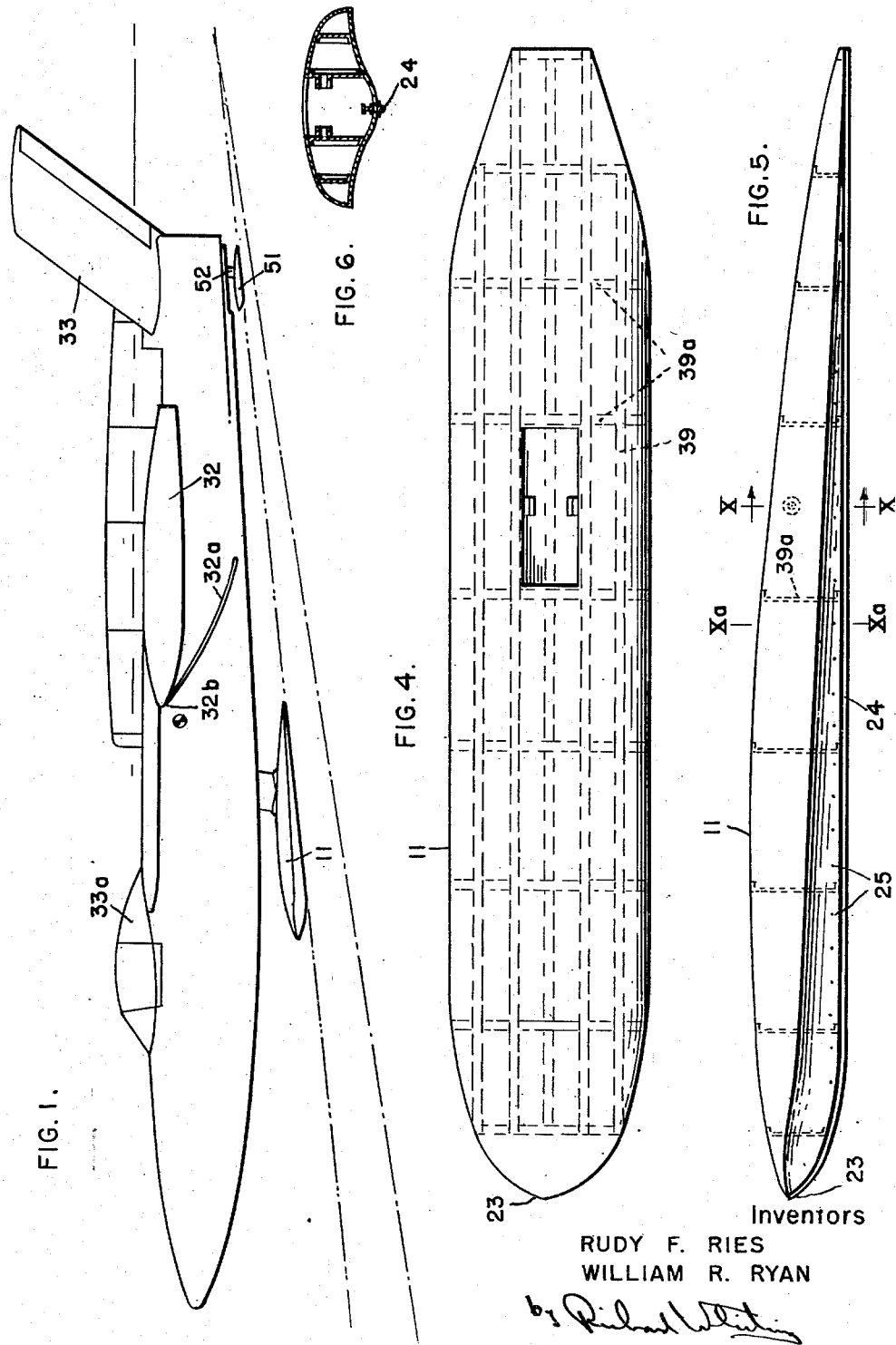

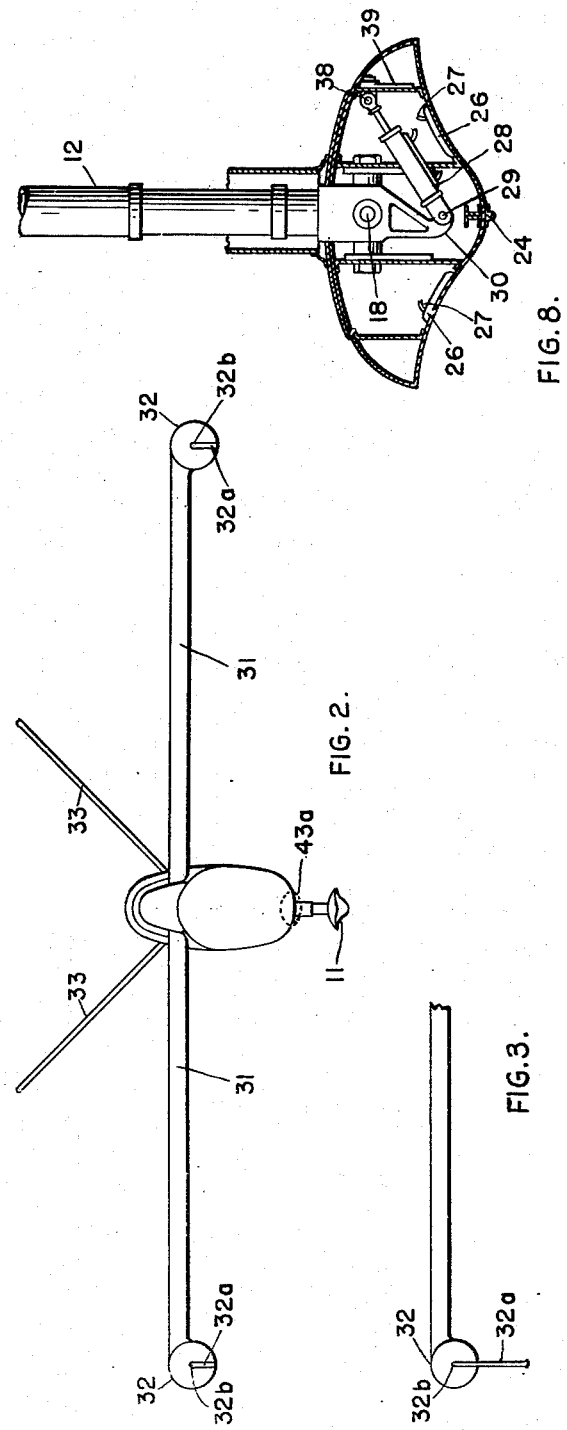

2,692,740

UNITED STATES PATENT OFFICE 2,692,740

AMPHIBIOUS AIRCRAFT AND ELEMENTS THEREOF

Rudy F. Ries, Beechhurst, N. Y., and William R. Ryan, Riverside, Conn., assignors to Edo Corporation, College Point, N. Y., a corporation of New York Application November 18, 1949, Serial No. 128,206

3 Claims. (Cl. 244—108)

This invention relates to means for rocking loose a partially rotatable element upon which is supported at least a portion of the weight of a craft, from a sod, mud, snow, ice or other binding surface in which such element may have become embedded.

This invention is particularly useful in rocking free the inverted apexed element called a hydro-ski which is the subject of our divisional application, Serial No. 261,846, filed November 8, 1951, and which together with our preferred type of aircraft is fully described as to construction and operation in our said divisional application.

Our means in its preferred embodiment comprises a hydraulic rocking jack disposed between a fixed member of the aircraft and one side of said element whereby the element may be partially rotated with respect to said fixed member.

Other objects and uses of our invention will be apparent from the following description and drawings:

Fig. 1 is a side elevation of the hydro-ski aircraft described more fully in our aforementioned divisional application.

Fig. 2 is a front view of said aircraft in position for landing on ice or snow.

Fig. 3 is a front view of the left wing of the aircraft shown in Fig. 2.

Fig. 4 is a plan view of our hydro-ski element to which we have applied our novel rocking jack and Fig. 5 is a side elevation thereof.

Fig. 6 is a section of the hydro-ski taken on the line X—X of Fig. 5.

Fig. 8 is an enlarged detail partly in section on the line Xa—Xa of Fig. 5, showing the strut by which the hydro-ski is secured to the aircraft, the rocking jack and the manner of attaching the latter to the hydro-ski.

Figure 7:
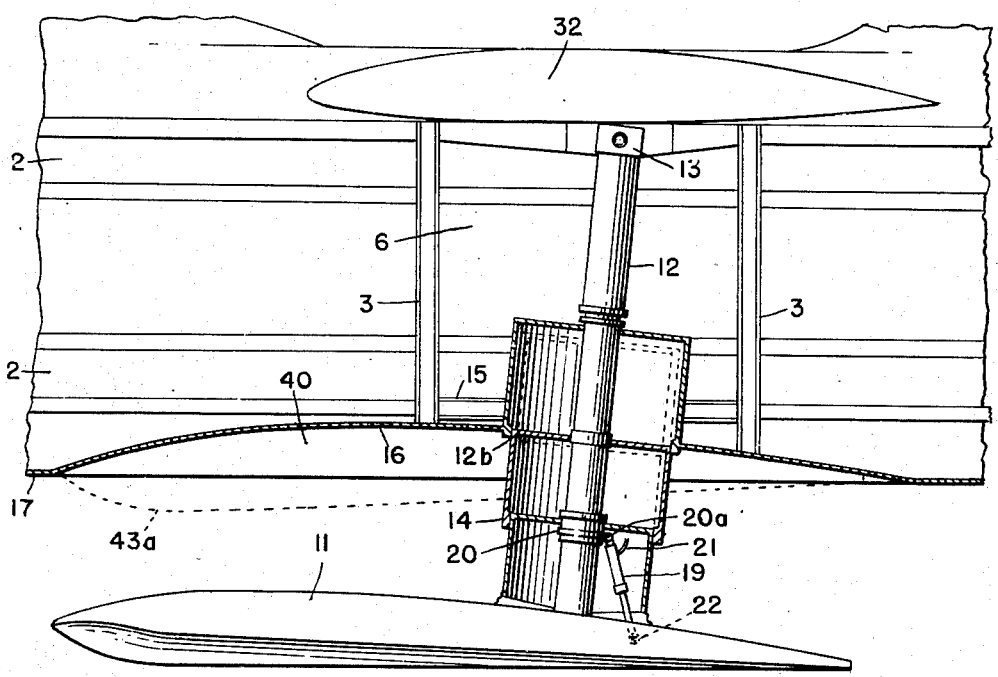
Fig. 7 is a side elevation of our hydro-ski attached to the aircraft, all as is more fully described in our said divisional application.

To describe adequately our present invention it is not necessary to explain fully the construction and operation of the entire aircraft of Figs. 1 and 2. Such explanation may be found in our divisional application referred to above.

Suffice it to say that the aircraft is designed to be landed, and primarily supported while landed, on a slippery surface such as ice, snow or mud, upon the hydro-ski element 11 which is secured to the strut 12. The upper extremity of the latter, in turn, is secured to the aircraft frame in the manner shown in Fig. 7. Support of the aircraft's extremities is effected by the flexible wing-tip skids 32a and by the tail tandem hydro-ski 51.

It will be seen from Figs. 4-8 that the hydro-ski 11 itself is a hollow low-aspect ratio hydro-foil having a rounded tip surface and a bottom surface which is concave-convex-concave V-shaped. The normal position of this hydro-ski is vertical as shown in Fig. 8. However, the hydro-ski is partially rotatable about a longitudinal axis through the pivot 18.

It is well known that aircraft skis, under certain snow and ice conditions, tend to "freeze-in" to the snow or ice surface upon which the skis come to rest, after the weight of the aircraft is supported by the skis for a certain length of time. It then becomes quite difficult to move the aircraft from the spot where the skis have been thus "frozen-in." Our hydro-ski, when not equipped with orifices for exuding a de-icing fluid, is not exempt from this difficulty. We have, therefore, provided a double acting hydraulically operated rocking jack 28, which as seen from Fig. 8 is pivotally secured on one end at 29 to an extension 30 of the shock strut 12, and on the other end, to a pin connection 38 on one of the longitudinal reenforcing members 39 of the hydro-ski. This jack 28 provides sufficient force to tilt the ski laterally relative to the aircraft, using the ski as a fulcrum point. In this process the wing-tip skids 32a (Figs. 1, 2 and 3) are sufficiently rigid to maintain the aircraft in a substantially level lateral position. The rocking jack has the effect of dislodging the ski from any frozen surface in which it may have become embedded.

We claim:

1. In a craft adapted to operate on a substantially solid surface, said craft having an under supporting element partially rotatable relative to the aircraft, the axis of rotation substantially paralleling the plane of the surface, said element being provided with an inverted apexed area in contact with said surface, means for rocking said element and hence said apexed area free from said surface when "frozen in," said means comprising a hydraulic ram combination, said ram being disposed in a plane substantially perpendicular to the axis of rotation of said element, one end of said ram being secured to a fixed portion of the craft, and the opposite end of said ram being secured to one side of said element, a source of fluid under pressure, means for conveying said fluid to said cylinder, means for controlling the flow of said fluid, and said fluid and said ram having sufficient force to rotate the element relative to the craft.

2. The means as described in claim 1 wherein the hydraulic ram is double acting.

3. The means as described in claim 1, wherein said ram is constituted of a cylinder and a piston-plunger slidable in said cylinder, said cylinder being the end of the ram secured to the non-rotatable portion of the craft, and said piston plunger being the end secured to said element.

References Cited in the file of this patent

UNITED STATES PATENTS

| Number | Name | Date |
|---|---|---|
| 1,203,550 | Curtiss | Oct. 31, 1916 |
| 1,373,408 | Burgess | Apr. 5, 1921 |
| 1,462,533 | Clark | July 24, 1923 |
| 1,561,697 | Dewoitine | Nov. 17, 1925 |
| 1,613,842 | Mummert | Jan. 11, 1927 |
| 1,810,762 | Gish | June 16, 1931 |
| 1,817,901 | Procofieff-Seversky | Aug. 4, 1931 |
| 1,835,618 | Waller | Dec. 8, 1931 |
| 1,965,258 | Ragsdale | July 3, 1934 |
| 2,073,864 | Brush | Mar. 16, 1937 |
| 2,131,528 | Soyer | Sept. 27, 1938 |
| 2,170,958 | Andrews | Aug. 29, 1939 |
| 2,302,343 | Noorduyn | Nov. 17, 1942 |
| 2,316,622 | Richard | Apr. 13, 1943 |

FOREIGN PATENTS

| Number | Country | Date |
|---|---|---|
| 354,841 | Germany | June 16, 1922 |
| 587,317 | Great Britain | Apr. 22, 1947 |
| 765,565 | France | Mar. 26, 1934 |